(12) United States Patent
Yasuda et al.

(10) Patent No.: US 8,744,784 B2
(45) Date of Patent: Jun. 3, 2014

(54) DIAGNOSTIC MECHANISM IN DIFFERENTIAL PRESSURE TYPE MASS FLOW CONTROLLER

(75) Inventors: Tadahiro Yasuda, Kobe (JP); Kazuhiro Matsuura, Kyoto (JP); Kentaro Nagai, Kyoto (JP); Daniel Mudd, Saint Charles, MO (US)

(73) Assignee: Horiba STEC, Co., Ltd., Kyoto-shi (JP)

( * ) Notice: Subject to any disclaimer, the term of this patent is extended or adjusted under 35 U.S.C. 154(b) by 583 days.

(21) Appl. No.: 12/513,353

(22) PCT Filed: Oct. 29, 2007

(86) PCT No.: PCT/JP2007/071030
§ 371 (c)(1),
(2), (4) Date: May 1, 2009

(87) PCT Pub. No.: WO2008/053839
PCT Pub. Date: May 8, 2008

(65) Prior Publication Data
US 2010/0070240 A1    Mar. 18, 2010

(30) Foreign Application Priority Data

Nov. 2, 2006  (JP) ................................ 2006-299701
Dec. 5, 2006  (JP) ................................ 2006-328664

(51) Int. Cl.
*G01F 1/00*  (2006.01)
*G01F 7/00*  (2006.01)

(52) U.S. Cl.
USPC ............... 702/45; 702/50; 702/100; 702/138

(58) Field of Classification Search
CPC ....................................................... G01F 1/34
USPC ............ 702/183, 45, 100, 138, 50, 182, 185; 73/202; 60/286, 277, 295
See application file for complete search history.

(56) References Cited

U.S. PATENT DOCUMENTS

| | | | |
|---|---|---|---|
| 2004/0083807 A1* | 5/2004 | Mudd et al. | 73/204.21 |
| 2006/0011237 A1* | 1/2006 | Tison et al. | 137/487.5 |

(Continued)

FOREIGN PATENT DOCUMENTS

| | | |
|---|---|---|
| JP | 08-063235 | 8/1996 |
| JP | 11-223538 | 8/1999 |

(Continued)

OTHER PUBLICATIONS

Kloeppner, R., Measuring Volumes with Gas Mass Flow Sensors, Sep. 2005, Medical Device Technology, vol. 16, Issue 7, pp. 16-17.*

(Continued)

*Primary Examiner* — John Breene
*Assistant Examiner* — Yaritza H Perez Bermudez
(74) *Attorney, Agent, or Firm* — Alleman Hall McCoy Russell & Tuttle, LLP

(57) ABSTRACT

This invention provides a diagnostic mechanism of a differential pressure type mass flow controller comprising a diagnostic parameter calculating section that obtains a mass flow rate integrated value by means of an integrating calculation from the lowering pressure value of an inlet side sensor among the inlet side sensor and an outlet side sensor arranged in communication respectively at the inlet side and the outlet side of a differential pressure generating resistive element that generates a differential pressure between the inlet and the outlet by changing a flow rate control valve arranged on the channel where a fluid flows from a flow rate control state to a closed state, and further obtains a diagnostic volume value from the obtained mass flow rate integrated value, and a comparing section that compares the diagnostic volume value obtained at the diagnostic parameter calculating section with a specified volume value.

13 Claims, 13 Drawing Sheets

(56) References Cited

U.S. PATENT DOCUMENTS

2006/0052904 A1* 3/2006 Brodeur et al. ............... 700/282
2007/0233412 A1* 10/2007 Gotoh et al. .................. 702/100

FOREIGN PATENT DOCUMENTS

| | | |
|---|---|---|
| JP | 11-294631 | 10/1999 |
| JP | 2000-137528 | 5/2000 |
| JP | 2000-214916 | 8/2000 |
| JP | 2003-65814 | 5/2003 |
| JP | 2004-177308 | 6/2004 |
| TW | 200506257 A | 2/2005 |
| TW | 200615725 A | 5/2006 |

OTHER PUBLICATIONS

ISA/Japanese Patent Office, International Search Report of PCT/JP2007/071030, Nov. 26, 2007, 2 pages, Japan.

* cited by examiner ional flow controller and a piping system constituting a flow channel located on a downstream side of the nozzle.

DIAGNOSTIC MECHANISM IN DIFFERENTIAL PRESSURE TYPE MASS FLOW CONTROLLER

This invention relates to a flow controller that controls a flow rate of a fluid such as a gas or a liquid in a semiconductor manufacturing process.

BACKGROUND ART

Conventionally, a flow rate control unit represented by a pressure type flow controller known as a nozzle diagnostic mechanism can diagnose abnormality of a flow channel narrowing nozzle and a piping system constituting a flow channel located on a downstream side of the nozzle.

This kind of nozzle diagnostic mechanism comprises a control section that makes it possible to diagnose an inside flow channel narrowing nozzle by reading a time dependent change of a gas pressure value inside the flow channel in conjunction with an open/close movement of a close valve and a flow rate adjusting valve at a time of self-diagnosis in a state that the flow rate adjusting valve is closed and the close valve is open.

Then, in the case that no abnormality exists in the gas flow channel, a curve line of the time dependent change of the gas pressure value measured at a time of conducting a self-diagnosis (t=0~$\Delta$t) such as a nozzle clog describes a curve line that almost overlaps a specified value. On the contrary, in the case that the flow channel narrowing nozzle is clogged, a descending speed of an initial pressure slows from a start (at a time t=0) of the self-diagnosis time as shown in a virtual line. More specifically, at a time when the time dependent change curve line of the gas pressure is abnormal, it can be known that the abnormal curve line is attributed to the clogged nozzle (refer to patent document 1).

Patent document 1: Japan patent laid-open number 2000-214916

DISCLOSURE OF THE INVENTION

Problems to be Solved by the Invention

However, since whether the nozzle is clogged or not is judged from a gradient of the curve line, for example, in the case of diagnosing the abnormality in a differential pressure type mass flow controller, there is a problem that an error might be generated in the judged result because of an influence from a noise if there is a peak dip noise in the curve line.

The present claimed invention intends to solve all of the problems and a main object of this invention is to provide a flow rate control unit that can find a problem such as clogging in the resistive element (also referred to as the differential pressure generating resistive element) like the nozzle or other residual gas existing in the former process so as to diagnose whether or not there is an abnormality with high accuracy for a short period of time.

Means to Solve the Problems

More specifically, a mass flow controller or a diagnostic mechanism in the mass flow controller in accordance with this invention is characterized by comprising a valve control signal output section that outputs a signal for making a valve arranged in a flow channel wherein a fluid flows in a closed state, a signal receiving section that receives a detection signal from pressure sensors arranged at an inlet side and an outlet side of a differential pressure generating resistive element arranged in the flow channel respectively, in a state that the valve is closed, a diagnostic parameter calculating section that calculates a diagnostic parameter having a value based on a time-integrated value of the pressure during an interval while a pressure at the inlet side or the outlet side obtained from the detection signal changes from a predetermined first pressure to a predetermined second pressure, and a comparing section that compares a value of the diagnostic parameter with a previously determined specified value.

It is a matter of course that "the valve" includes a flow rate control valve constituting a flow controller such as a differential pressure type mass flow controller (hereinafter also called a differential pressure type MFC), and the "valve" may include other valves (for example, a valve arranged separately from a valve for a flow controller of a differential pressure type MFC on the downstream or upstream side of the valve for the flow controller), and it may be not only the flow rate control valve but also just an open/close valve.

With this arrangement, since the time-integrated value of the pressure during the interval while the pressure changes in the certain range (from the first pressure to the second pressure) after the valve is closed is utilized in order to detect the abnormality of the differential pressure generating resistive element of the nozzle, even though there is, for example, a local peak dip noise in the pressure value, the time-integrated value of the noise is small. As a result, it is possible to make an influence on detection and judgment of the abnormality extremely small compared with a conventional arrangement so that an accuracy to detect the abnormality can be largely improved. The diagnostic parameter may be based on the time-integrated value of the pressure, for example, in addition to the time-integrated value of the pressure itself, an integrated value of a mass flow rate or an integrated value of a volume flow rate that can be calculated based on the time-integrated value of the pressure, or a value obtained by substituting these values into a predetermined calculation equation. In addition, since the pressure change of the flow channel volume between the valve and the differential pressure generating resistive element is utilized in this invention there is no need of a mechanism dedicated to diagnosis of abnormality, such as a reference instrument for verification or a tank, and it becomes possible to lower a cost without complicating a gas line. Furthermore, in the case that the flow channel volume is so small that it can be considered to be a dead volume between the valve and the differential pressure generating resistive element, it is possible to extremely shorten a time period while the pressure changes from the first pressure to the second pressure that specifies the time for diagnosis. Then in the case of applying this to, for example, a semiconductor process unit, it becomes possible to conduct a diagnosis during a process period, which can be said to be in real time, by making use of a short period of time while exchanging the gas or the like.

More specifically, it is possible to provide a flow rate control unit or a diagnostic mechanism in a flow rate control unit that can find a problem such as clogging in the resistive element like the nozzle or existing other residual gas so as to diagnose whether or not the abnormality exists with high accuracy for a short period of time with a simple structure.

In order to securely recognize generation of the abnormality in the resistive element, it is preferable to comprise a diagnostic result output section that outputs the existence of the abnormality in the case that the value of the diagnostic parameter differs from the specified value.

The diagnostic mechanism may comprise the diagnostic parameter calculating section that calculates a mass flow rate integrated value during the interval while the pressure at the inlet side where the flow rate control valve that closes the flow in the flow channel is arranged drops from the first pressure to the second pressure, namely may comprise, a diagnostic type by means of a mass flow rate integrated value of a laminar flow element resistive element and gas laws (Gas Law check of Integrated Flow Equation ("G-LIFE")).

Meanwhile, the diagnostic parameter calculating section may calculate a mass flow rate integrated value during the interval while the pressure at the outlet side where the flow rate control valve that closes the flow in the flow channel is arranged rises from the first pressure to the second pressure, and may comprise, a so-called ROR (Rate of rise) diagnostic type.

If the differential pressure generating resistive element is a laminar flow element and the laminar flow element has a nonlinear property, it is possible to make the pressure change relative to the flow rate change big in a low flow area and to make the pressure change relative to the flow rate change small in a high flow area, resulting in obtaining a flat flow rate accuracy collectively (the error in any flow rate area becomes a certain ratio to a reading value). As a result, since the pressure used for diagnosis can be set among a pressure (flow rate) of a broad range, it is possible to improve a diagnostic accuracy.

As a representative concrete arrangement of a pressure sensor, the pressure sensor comprises absolute pressure sensors each of which is arranged at the inlet side and the outlet side of the differential pressure generating resistive element respectively, or the pressure sensor comprises an absolute pressure sensor arranged at either one of the inlet side and the outlet of the differential pressure generating resistive element and a differential pressure type sensor arranged between the inlet and the outlet.

As a representative preferable arrangement, the valve control signal output section outputs a signal to make the valve in the closed state on the condition that the pressure detected by the pressure sensor indicates a predetermined value. The condition varies depending on a position of the valve relative to the differential pressure generating resistive element. Concretely, in the case that the valve is arranged on the upstream side of the differential pressure generating resistive element, the above-mentioned condition is that the pressure detected by the pressure sensor at the inlet side indicates a value higher than the first pressure, which is a start pressure. Meanwhile, in the case that the valve is arranged on the downstream side of the differential pressure generating resistive element, the above-mentioned condition is that the pressure detected by the pressure sensor at the outlet side indicates a value lower than the first pressure, which is a start pressure.

In accordance with this arrangement, a self diagnosis can be conducted at a desired timing during a sequence to automatically control the differential pressure type mass flow controller by inputting the desired timing by a user. Concretely, in the case that, for example, the valve is arranged on the upstream side of the differential pressure generating resistive element, the valve is operated so as to make the pressure detected by the inlet side pressure sensor higher than the first pressure, which is a start pressure, and the timing when the user desires to conduct the diagnosis can be designated during the sequence by a description that a signal to make the valve in the closed state is output to the valve control signal output section. As mentioned, since it is possible for the user to designate a point when the user conducts the self-diagnosis with a simple operation such as inputting the point when the user desires to conduct the self-diagnosis during the sequence, there is no need of adding a special command and it is possible to incorporate easily this arrangement into a conventional system.

As to a mass flow controller to which the present claimed invention is applied and whose effect becomes remarkable, a differential pressure type mass flow controller is represented. A concrete arrangement of the differential pressure type mass flow controller is characterized by comprising a flow rate control valve arranged on a flow channel where a fluid flows, a differential pressure generating resistive element that comprises an inlet into which the fluid flowing from the flow rate control valve is introduced and an outlet from which the fluid is discharged and that generates a differential pressure between the inlet and the outlet, an inlet side sensor that is arranged continuous to the flow channel at the inlet side and that detects a pressure of the fluid flowing in the flow channel, an outlet side sensor that is arranged continuous to the flow channel at the outlet side and that detects a pressure of the fluid flowing in the flow channel, a diagnostic parameter calculating section that obtains a mass flow rate integrated value from a pressure value at the inlet side sensor that drops in the case that the flow rate control valve is changed from a flow rate control state to a closed state by means of integrating calculation and that further obtains a diagnostic volume value by substituting the obtained mass flow rate integrated value into gas laws, and a comparing section that compares the diagnostic volume value obtained in the diagnostic parameter calculating section with a specified volume value.

In addition, the flow rate control unit may be a differential pressure type mass flow controller characterized by comprising an upstream side flow rate control valve and a downstream side flow rate control valve arranged on a flow channel where a fluid flows, a differential pressure generating resistive element that comprises an inlet into which the fluid flowing from the upstream side flow rate control valve is introduced and an outlet from which the fluid is discharged and that generates a differential pressure between the inlet and the outlet, an inlet side sensor that is arranged continuous to the flow channel at the inlet side and that detects a pressure of the fluid flowing in the flow channel, an outlet side sensor that is arranged continuous to the flow channel at the outlet side and that detects a pressure of the fluid flowing in the flow channel, a diagnostic parameter calculating section that obtains a mass flow rate integrated value from a pressure value at the outlet side sensor that rises in the case that the downstream side flow rate control valve is changed from a flow rate control state to a closed state by means of integrating calculation and that further obtains a diagnostic volume value by substituting the obtained mass flow rate integrated value into gas laws, an a comparing section that compares the diagnostic volume value obtained in the diagnostic parameter calculating section with a specified volume value.

Effect of the Invention

In accordance with this invention, it is possible to find a problem such as clogging in the resistive element (the differential pressure generating resistive element) like the nozzle or other existing residual gas in the former process and to diagnose whether or not there is abnormality with high accuracy for a short period of time.

BEST MODES OF EMBODYING THE INVENTION

One embodiment of this invention will be explained with reference to FIG. 1 through FIG. 5.

First Embodiment

G-LIFE Diagnosis, Volume Value Comparison Type

A differential pressure type mass flow controller A as being a flow control unit of this embodiment is called a G-LIFE diagnostic type and comprises a mass flow controller body A1 and a control unit A2 that is connected in communication with the mass flow controller body A1 and that produces a function as a diagnosis mechanism conducting diagnosis on the mass flow controller body A1. The differential pressure type mass flow controller A is used, for example, for a system to supply a gas to a chamber in the film forming equipment such as a semiconductor. Each component will be explained.

Figure 1:
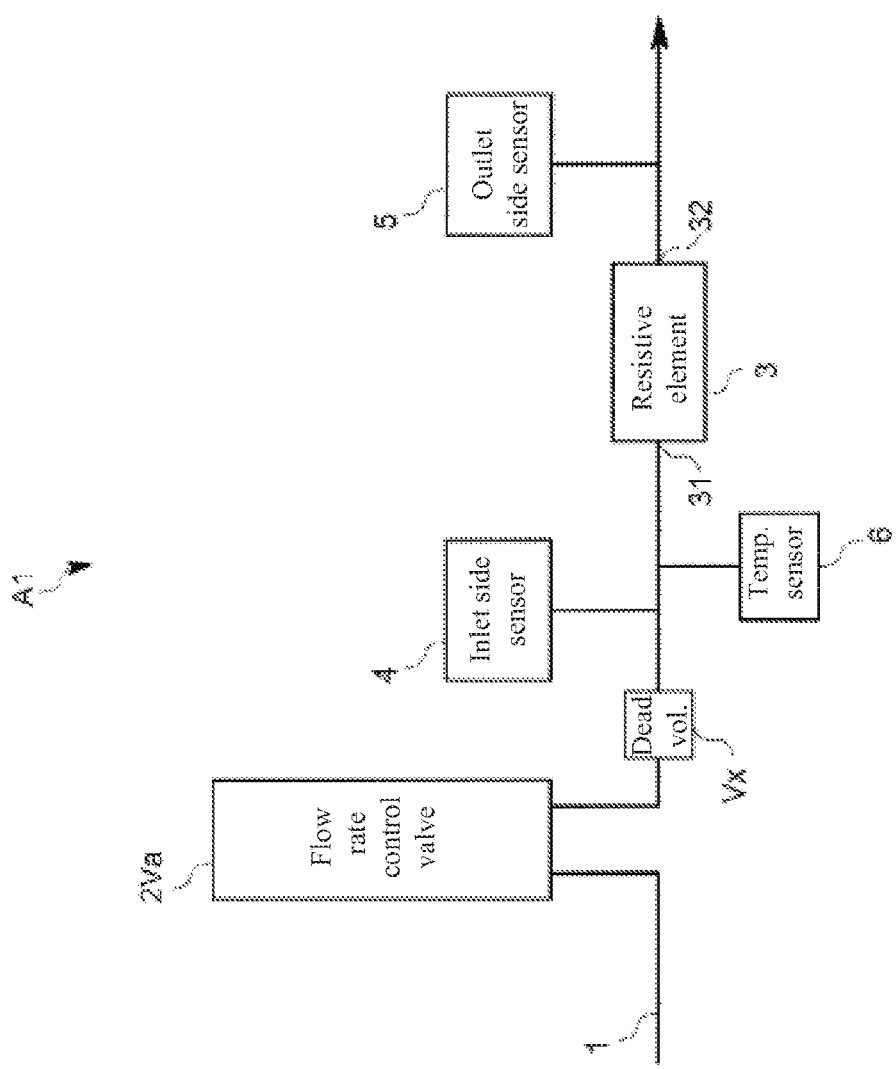
FIG. 1 is a pattern diagram showing a device configuration of a differential pressure type mass flow controller in accordance with one embodiment of this invention.

The mass flow controller body A1 comprises, as its pattern diagram is shown in FIG. 1, a gas flow channel 1 where a gas flows, a flow rate control valve 2Va arranged on the gas flow channel 1, a differential pressure generating resistive element 3, an inlet side sensor 4 that is arranged in communication with the flow channel 1 at an inlet 31 side and that detects a pressure of the gas flowing in the gas flow channel 1, an outlet side sensor 5 that is arranged in communication with the flow channel 1 at an outlet 32 side and that detects a pressure of the gas flowing in the gas flow channel 1 and a temperature sensor 6 that detects a temperature of the gas flowing in the flow channel 1 at the inlet 31 side.

The gas flow channel 1 opens its upstream end as an inlet port and its downstream end as an outlet port respectively, and, for example, an air pressure valve, a pressure regulator and a gas cylinder (not shown in drawings) are connected to the inlet port through an outside pipe and a chamber for manufacturing semiconductors (not shown in drawings) is connected to the outlet port through an outside pipe.

The flow rate control valve 2Va is, although its detail is not shown in drawings, arranged so as to change its valve open degree by means of an actuator comprising piezoelectric elements. The flow rate control valve 2Va drives the actuator with a valve open degree control signal as being an electric signal given by the control unit A2 and controls the flow rate of the gas by adjusting the valve open degree in accordance with a value of the valve open degree.

The resistive element 3 comprises the inlet 31 to introduce the flow flowing from the flow rate control valve 2Va and the outlet 32 to discharge the flow, and generates a differential pressure between the inlet 31 and the outlet 32. In this embodiment, in the case that the downstream side is in communication with a semiconductor process chamber, a laminar flow element having a nonlinear property that is referred to as a nonlinear restrictor under a reduced pressure is used.

A pressure sensor of an absolute pressure type is used as the inlet side sensor 4 in this embodiment.

Similar to the inlet side sensor 4, a pressure sensor of an absolute pressure type is used as the outlet side sensor 5 in this embodiment.

The control unit A2 comprises a digital or analog electric circuit having a CPU, an internal memory, an A/D convertor and a D/A convertor (not shown in drawings), a communication interface to communicate with each section of the mass flow controller body A1, an input interface and a display device such as a liquid crystal display, and may be dedicated or a part or all of them may utilize a multipurpose computer such as a personal computer. In addition, an analog circuit alone may serve the following function without using a CPU. A control unit (omit to be shown in drawings) for film forming equipment may serve both as a part of the function. The control unit A2 is not necessarily physically integrated, and may comprise multiple instruments mutually connected to each other by wire or without wires.

Figure 2:
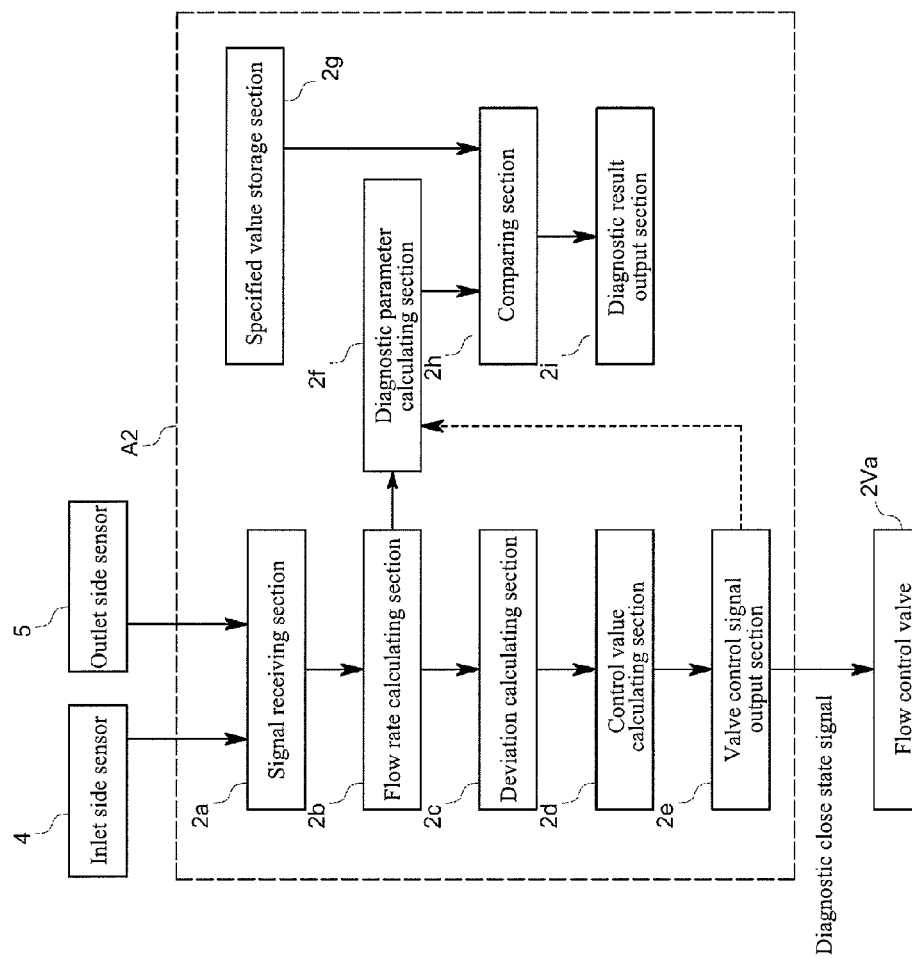
FIG. 2 is a functional configuration diagram of the differential pressure type mass flow controller of this embodiment.

Then a predetermined program is stored in the internal memory and the CPU and its peripheral devices are operated based on the program so that the control unit A2 produces functions, as shown in FIG. 2, at least as a signal receiving section 2a, a flow rate calculating section 2b, a deviation calculating section 2c, a control value calculating section 2d, a valve control signal output section 2e, a diagnostic parameter calculating section 2f, a specified value storage section 2g, a comparing section 2h and a diagnostic result output section 2i. Each section will be described.

The signal receiving section 2a receives respective electric signals indicating pressure values detected by each pressure sensor 4, 5 at a predetermined timing and is configured to make use of a communication interface.

The flow rate calculating section 2b calculates a mass flow rate of the gas based on the pressure values received in the signal receiving section 2a and detected by each pressure sensor 4, 5.

The deviation calculating section 2c calculates a deviation between the mass flow rate of the gas obtained in the flow rate calculating section 2b and a flow rate set value.

The control value calculating section 2d calculates a feedback control value to the flow rate control valve 2Va by providing at least a proportional calculation (additionally, an integrating calculation or a differential calculation may be included) on the deviation obtained in the deviation calculating section 2c.

The valve control signal output section 2e produces an open degree (a valve position) control signal having a value based on the feedback control value obtained in the control value calculating section 2*d*, and outputs the open degree control signal to the flow rate control valve 2Va. The valve control signal output section 2*e* makes use of the communication interface. In this embodiment, in order to conduct a diagnosis, a diagnostic close state signal to make the flow rate control valve 2Va in a closed state can be output by appropriately operating, for example, an input interface.

The diagnostic parameter calculating section 2*f* receives the mass flow rate of the gas from the flow rate calculating section 2*b* and obtains a mass flow rate integrated value by integrating the mass flow rate of the gas during an interval when the pressure at the upstream side of the resistive element 3 changes from a first pressure to a second pressure in a state that the flow rate control valve 2Va is changed from the flow rate control state to the closed state. In addition, the diagnostic parameter calculating section 2*f* obtains a diagnostic volume value from gas laws based on a parameter such as the mass flow rate integrated value, a pressure value change (drop) between a pressure value of the inlet side sensor 4 at a start timing of the above-mentioned interval and a pressure value of the inlet side sensor 4 at an end timing thereof and a temperature value obtained from the temperature sensor 6.

More concretely, the diagnostic parameter calculating section 2*f* obtains a drop amount $\Delta P1$ of the pressure value of the inlet side sensor 4 during an interval from a timing (a start point a) of the first pressure $P1_{START}$, for example, several msec after a time when the valve control signal output section 2*e* outputs the diagnostic close state signal as being a trigger, to a timing (an end point b) of the second pressure $P1_{END}$ several sec~several min after the time. For example, in the case of FIG. 3, the pressure drop amount $\Delta P1$ at the inlet side sensor 4 during the interval of a-b is obtained.

In addition, the diagnostic parameter calculating section 2*f* receives the mass flow rate Q during the interval of $P1_{START}$~$P1_{END}$ obtained from the equation (1) by the flow rate calculating section 2*b*.

[Equation 1]

$$Q=(P1^2-P2^2)X \quad (1)$$

where P1 is a pressure value at the inlet side sensor 4 and P2 is a pressure value at the outlet side sensor 5. In addition, X is a coefficient that changes depending on the kind of gas.

Next, the diagnostic parameter calculating section 2*f* calculates the mass flow rate integrated value n by conducting time-integration according to the following equation (2) on the mass flow rate Q during the interval. For example, in the case of FIG. 4, a total sum of the mass flow rate Q in the interval of a-b shown by diagonal lines can be obtained as the mass flow rate integrated value n by means of the integrating calculation.

[Equation 2]

$$n = \int_t^b Q\,dt \quad (2)$$

In addition, the mass flow rate integrated value n can also be expressed by the following equation (3) by the use of a diagnostic volume V from gas laws.

$$n = P1_{START}V/RT - P1_{END}V/RT \quad (3)$$

Furthermore, the diagnostic volume value V is expressed by the following equation (4) by the use of equation (2) and equation (3).

[Equation 4]

$$\int_a^b Q\,dt = P1_{START}V/RT - P1_{END}V/RT \quad (4)$$
$$= V/RT(P1_{START} - P1_{END})$$
$$= \Delta P1 V/RT$$
$$\therefore V = \frac{RT}{\Delta P1}\int_a^b Q\,dt$$

The diagnostic parameter calculating section 2*f* calculates the diagnostic volume value V by substituting the obtained mass flow rate integrated value n into a following equation (5) derived by the equation (2) and the equation (4).

[Equation 5]

$$V=nRT/\Delta P1 \quad (5)$$

where n is a number of moles (time-integrated value of a mass per time (a mass flow rate Q) obtained from the equation (1), namely a mass flow rate integrated value), R is a gas constant (known from the gas to be controlled), T is temperature (a value specified by an output from the temperature sensor 6) and $\Delta P1$ is a pressure drop amount of the inlet side sensor 4.

The specified value storage section 2*g* stores a specified volume value $V_0$ and is formed in a predetermined area of the internal memory.

In this embodiment, a flow rate volume (a dead volume) from the flow rate control valve 2Va to an inlet of the resistive element 3 is stored as the specified volume value $V_0$.

The comparing section 2*h* compares a diagnostic volume value V obtained in the diagnostic parameter calculating section 2*f* with the specified volume value $V_0$.

The diagnostic result output section 2*i* makes use of the display device and outputs existence of abnormality to the display device in the case that the comparison result of the comparing section 2*h* shows that the diagnostic volume value V is different from the specified volume value $V_0$.

A diagnostic method of the differential pressure type mass flow controller A having the above arrangement will be explained.

First, if the pressure detected by the inlet side sensor 4 is lower than the start pressure (at a timing of $P1_{START}$), the pressure is increased so as to be higher than the start pressure before making the flow rate control valve 2Va in a closed state.

Figure 5:
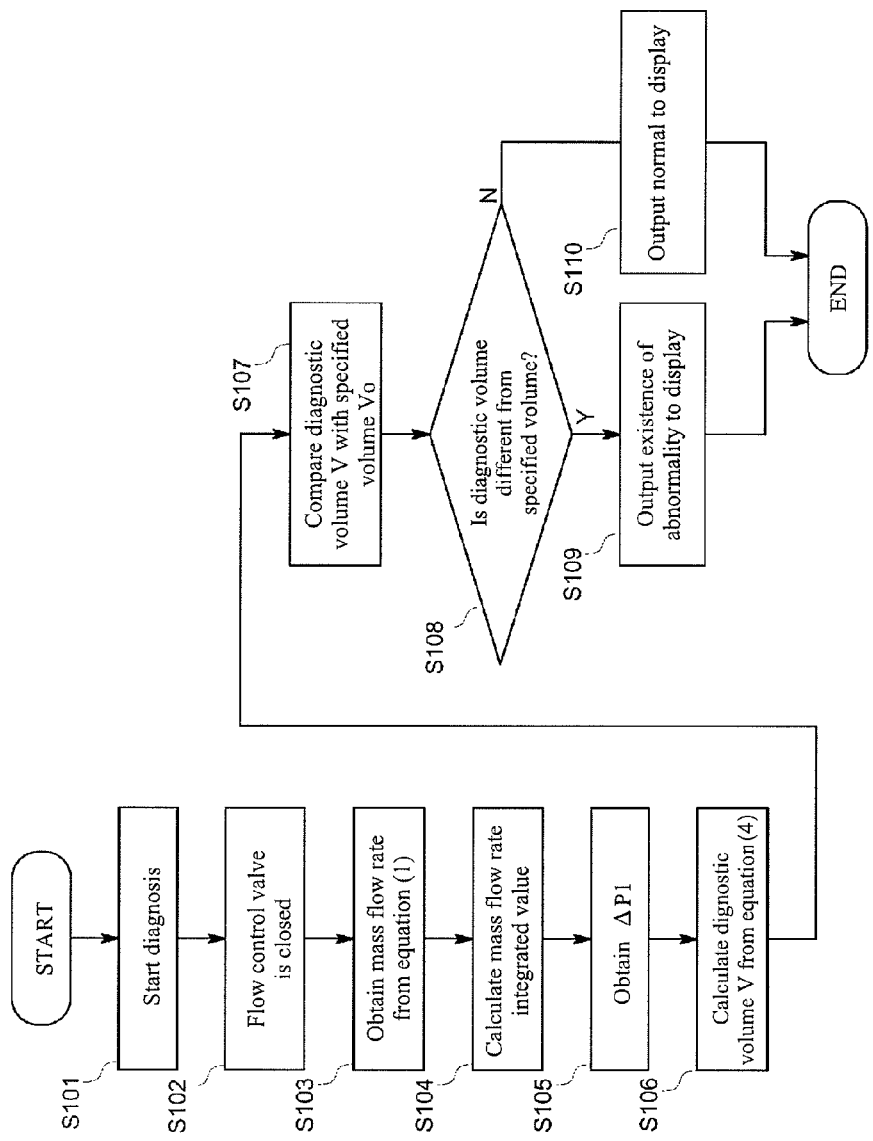
FIG. 5 is a flow chart showing an operation of the differential pressure type mass flow controller of this embodiment.

Then as shown in FIG. 5, the diagnostic close state signal is output from the valve control signal output section 2*e* of the control unit A2 to the flow rate control valve 2Va that is in a flow control state so as to start the diagnosis (step S101).

When the flow rate control valve 2Va receives the diagnostic close state signal, the flow rate control valve 2Va becomes in a closed state (step S102). Then, the downstream side of the mass flow controller A is drawn in at a predetermined pressure so that a pressure in the dead volume Vx between the flow rate control valve 2Va and the resistive element 3 begins to drop.

Then, the flow rate calculating section 2*b* calculates the mass flow rate from the above-mentioned equation (1) with the detected values detected in each pressure sensor 4, 5 as a parameter (step S103).

Next, the diagnostic parameter calculating section 2*f* receives the mass flow rate Q and calculates the mass flow rate integrated value n by conducting time-integration on the mass flow rate Q during the interval from the timing of $P1_{START}$ to the timing of $P1_{END}$ (step S104). The mass flow rate integrated value n is a value based on the integrated value of the pressure from the successive calculations.

In addition, the diagnostic parameter calculating section $2f$ obtains the pressure drop amount $\Delta P1$ at the inlet side sensor 4 during the interval from the timing of $P1_{START}$ to the timing of $P1_{END}$ (step S105).

Furthermore, the diagnostic parameter calculating section $2f$ calculates the diagnostic volume value V by substituting the mass flow rate integrated value n obtained in step S104 and the temperature detected in the temperature sensor 6 into the gas laws (equation (2)) (step S106). The temperature T used for calculating the diagnostic volume value V may use the detected value by the temperature sensor 6 at the timing of $P1_{START}$ or may use the detected value at the timing of $P1_{END}$. This is because there is almost no temperature change between the timing of $P1_{START}$ and the timing of $P1_{END}$.

The comparing section $2h$ compares the diagnostic volume value V obtained in the diagnostic parameter calculating section $2f$ with the specified volume value $V_0$ (step S107). If the comparison result in the comparing section $2h$ shows that the diagnostic volume value V differs from the specified volume value $V_0$ (for example, in the case that a performance of the resistive element 3 drops, the mass flow rate Q also drops and the integrated value becomes small as well)(step S108), the diagnostic result output section $2i$ outputs an existence of abnormality in the resistive element 3 to the display device (step S109). On the contrary, if the comparison result shows that the diagnostic volume value V is the same as the specified volume value $V_0$ (step S108), the diagnostic result output section $2i$ outputs no existence of abnormality in the resistive element 3 to the display device (step S110).

As a result, in accordance with the differential pressure type mass flow controller A of this embodiment, when the flow rate control valve 2Va is changed from the flow control state to the closed state, the mass flow rate Q is calculated based on the detected values in each pressure sensor 4, 5, the mass flow rate integrated value is obtained by conducting time-integration on the mass flow rate Q during a certain interval, and the diagnostic volume value is obtained by substituting the mass flow rate integrated value and the above-mentioned pressure drop amount $\Delta P1$ into the gas laws. As a result, even though there is, for example, a local peak dip noise in the pressure value, almost no influence is received from the noise. Accordingly, it is possible to conduct a diagnosis of existence of abnormality with accuracy such that a clogging or residual gas generated due to deterioration with age of the laminar flow element as being the resistive element 3 can be found suitably. In addition, since a reference instrument for flow rate calibration becomes unnecessary and its calibration time also becomes unnecessary, a gas line can be simplified and a cost can be reduced as well. In addition, if the flow rate control valve 2Va closes for even a moment, it becomes possible to conduct a diagnosis, thereby further simplifying the diagnosis.

More specifically, it is possible to provide a differential pressure type mass flow controller A having a superior diagnostic mechanism such that a trouble such as clogging of the resistive element 3 can be found accurately and that the diagnosis of existence of abnormality can be conducted in a short period of time with accuracy.

In addition, since the laminar flow element having the nonlinear property is used as the resistive element 3, it is possible to make the pressure change relative to the flow rate change big in a low flow area and to make the pressure change relative to the flow rate change small in a high flow area, resulting in obtaining a flat flow rate accuracy collectively.

Figure 3:
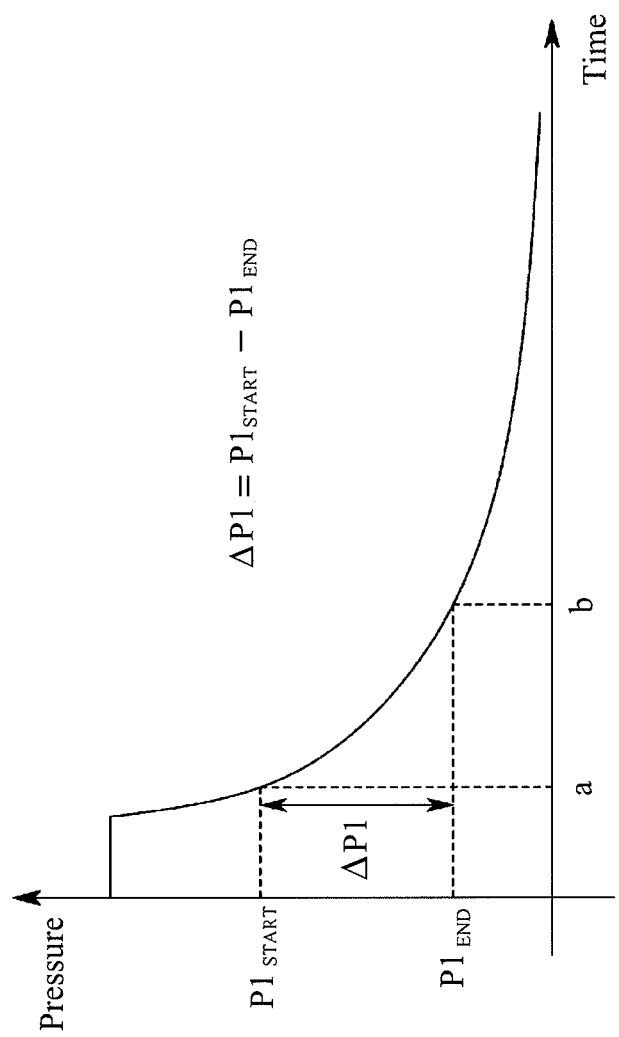
FIG. 3 is a diagram for explaining a pressure drop amount at an inlet side sensor in this embodiment.
Figure 4:
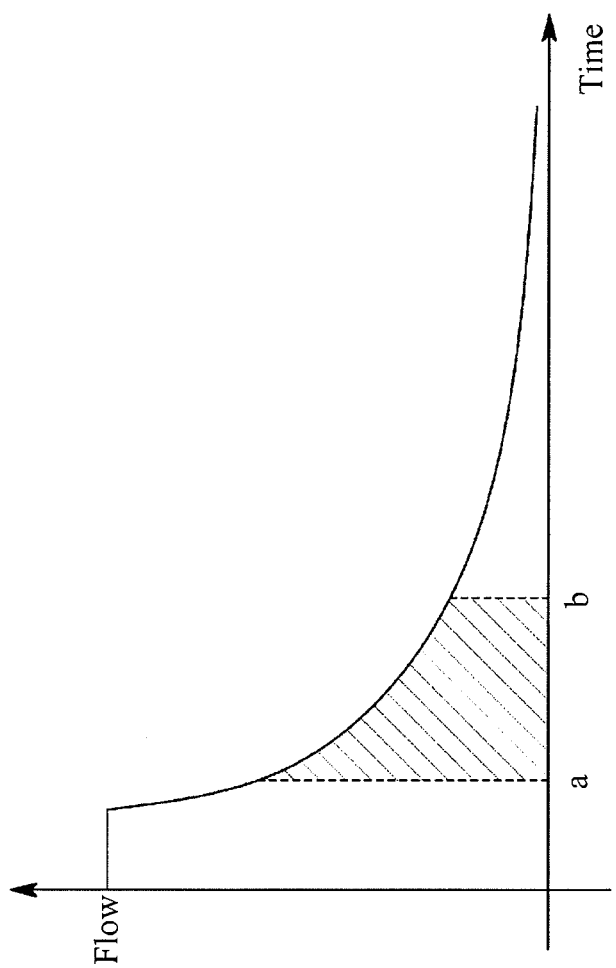
FIG. 4 is a diagram for explaining a mass flow rate integrated value in this embodiment.

For example, in the case of a differential pressure type mass flow controller for a small flow rate (FS100cc or less) having a small flow channel diameter or using a restrictor of a small number of a flow channel, it is possible to moderate a falling curve of the pressure in FIG. 3, thereby especially improving reproducibility of the diagnosis.

In addition, in the case that the comparison result in the comparing section $2h$ shows that the diagnostic volume value V differs from the specified volume value $V_0$, since the diagnostic result output section $2i$ that outputs the existence of abnormality of the resistive element 3 to the display device is arranged, it is possible to know the occurrence of abnormality in the resistive element 3 without fail.

Second Embodiment

ROR Diagnosis, Volume Value Comparison Type

Another embodiment of this invention will be explained with reference to FIG. 6~FIG. 10. In the second embodiment the same parts denoted by the same reference numerals and the same names as those in the first embodiment are supposed to have the same arrangement and to produce the same operation and effect as those of the first embodiment unless otherwise explained, and descriptions thereof will be omitted.

The differential pressure type mass flow controller A of this embodiment is generally called a ROR (Rate of rise) diagnostic type, and comprises a mass flow controller body A1, and a control unit A2 that is connected in communication with the mass flow controller body A1 and that produces a function as a diagnostic mechanism conducting a diagnosis on the mass flow controller body A1. Similar to the first embodiment, the differential pressure type mass flow controller A is used, for example, for a system to supply a gas to a chamber in a semiconductor process. Each component will be explained.

Figure 6:
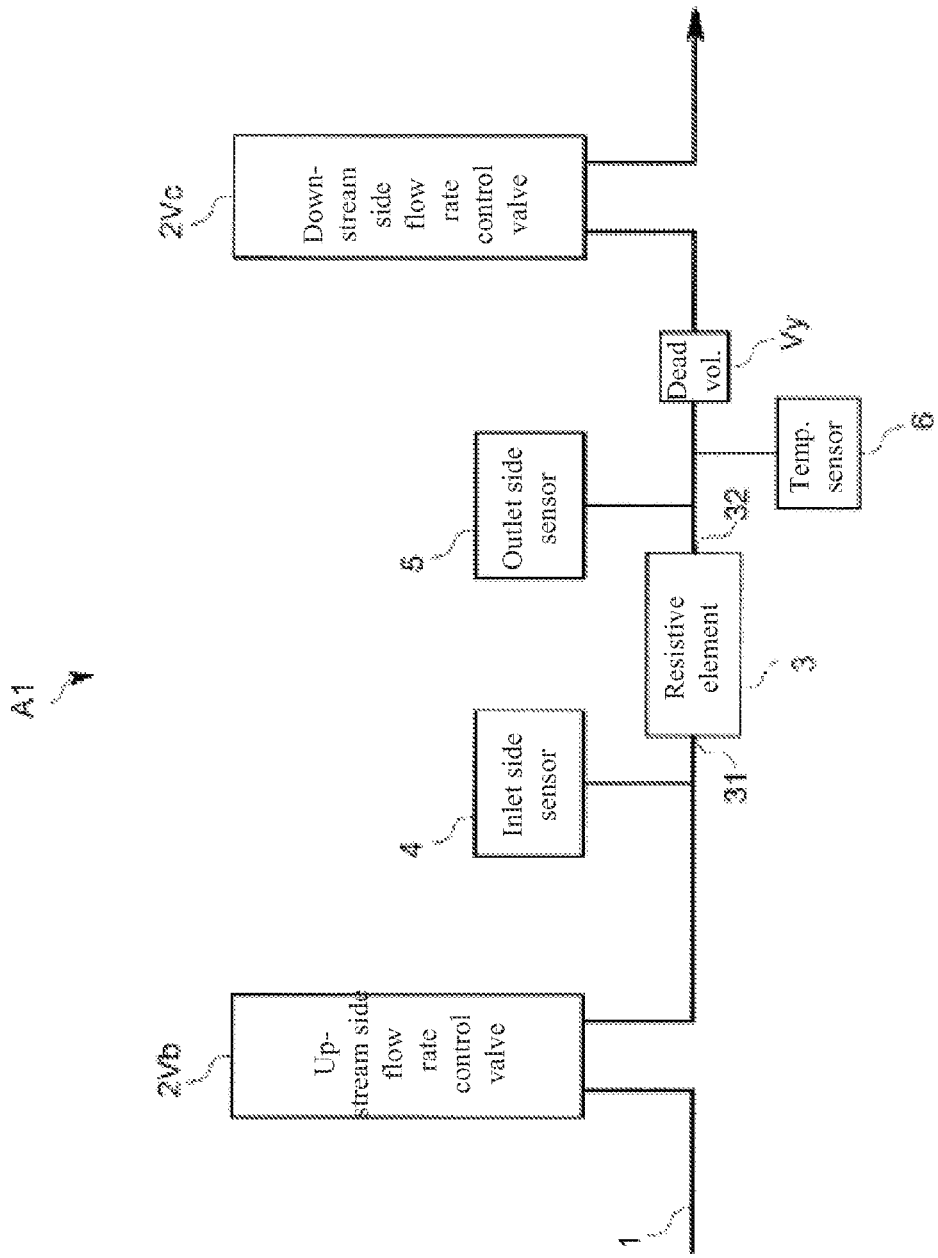
FIG. 6 is a pattern diagram showing a device configuration of a differential pressure type mass flow controller in accordance with another embodiment of this invention.

The mass flow controller body A1 comprises, as its pattern diagram is shown in FIG. 6, a gas flow channel 1 where a gas flows, an upstream side flow rate control valve 2Vb and a downstream side flow rate control valve 2Vc arranged on the gas flow channel 1, a resistive element 3 that comprises an inlet 31 from which the fluid flowing from the upstream side flow rate control valve 2Vb and an outlet 32 from which the fluid is discharged and that is to generate a differential pressure, an inlet side sensor 4 that is arranged in communication with the flow channel 1 at the inlet 31 side and that detects a pressure of the fluid flowing in the flow channel 1, an outlet side sensor 5 that is arranged in communication with the flow channel 1 at the outlet 32 side and that detects a pressure of the fluid flowing in the flow channel 1 and a temperature sensor 6 that detects a temperature of the gas flowing in the flow channel 1 at the outlet 32 side.

The upstream side flow rate control valve 2Vb and the downstream side flow rate control valve 2Vc are the same as the flow rate control valve 2Va of the first embodiment.

A configuration of the control unit A2 is the same as that of the first embodiment.

Figure 7:
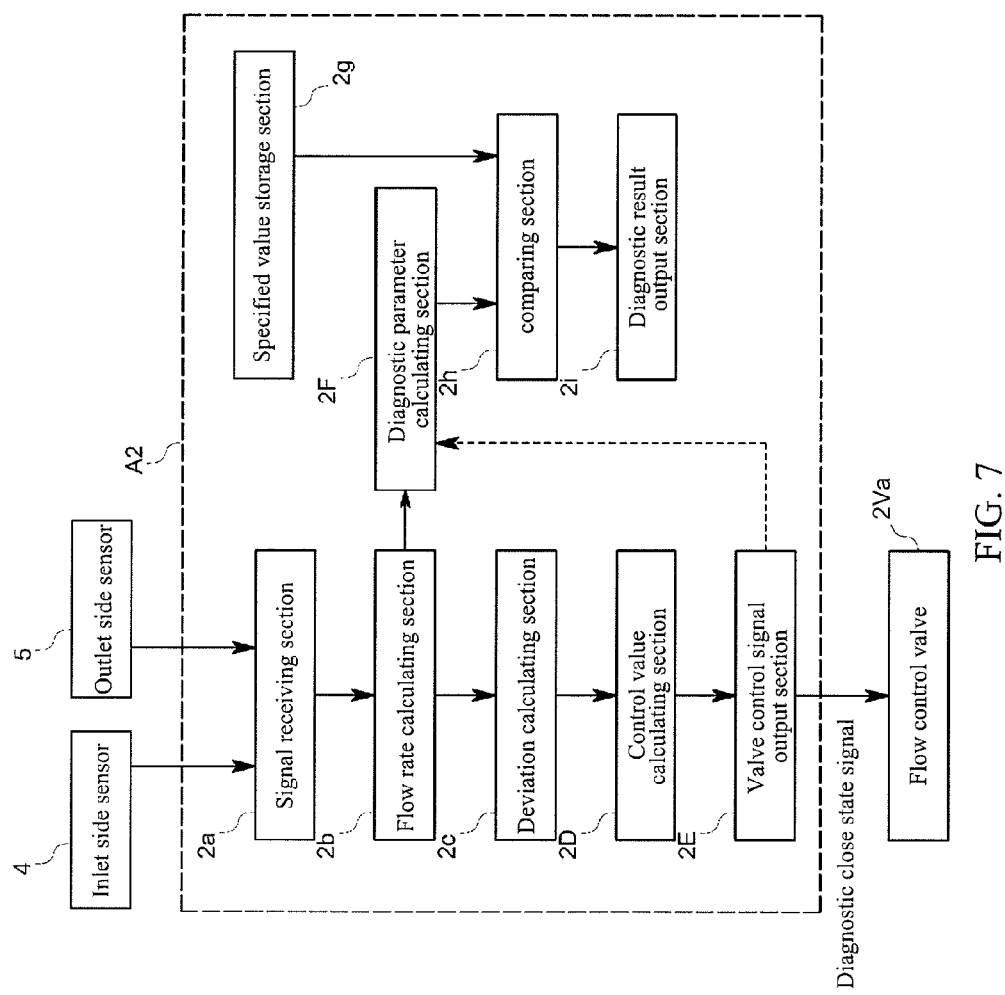
FIG. 7 is a functional configuration diagram of the differential pressure type mass flow controller of this embodiment.
Figure 8:
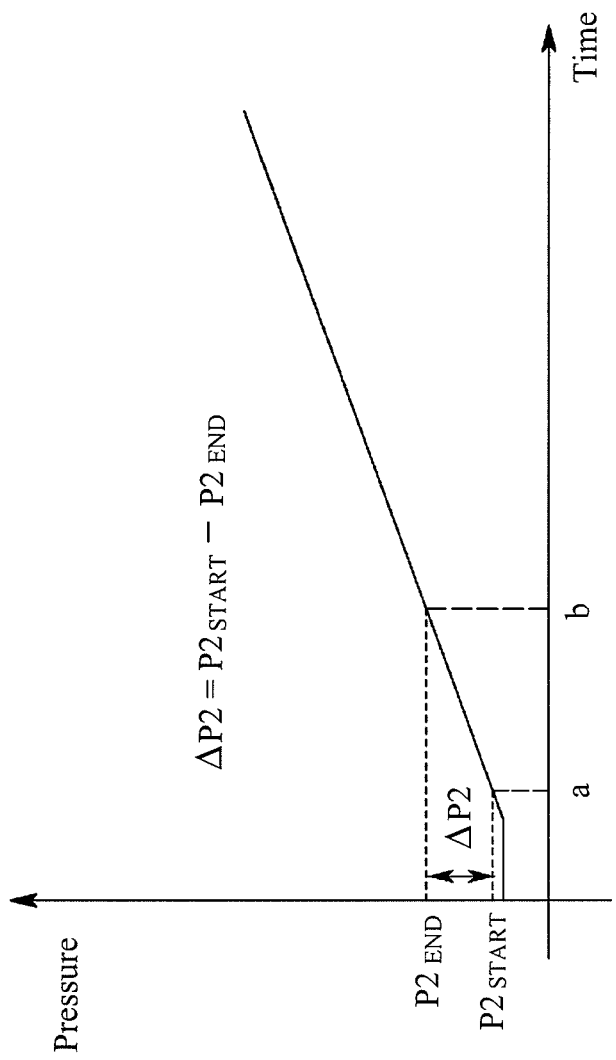
FIG. 8 is a diagram for explaining a pressure rise amount at the outlet side sensor in this embodiment.
Figure 9:
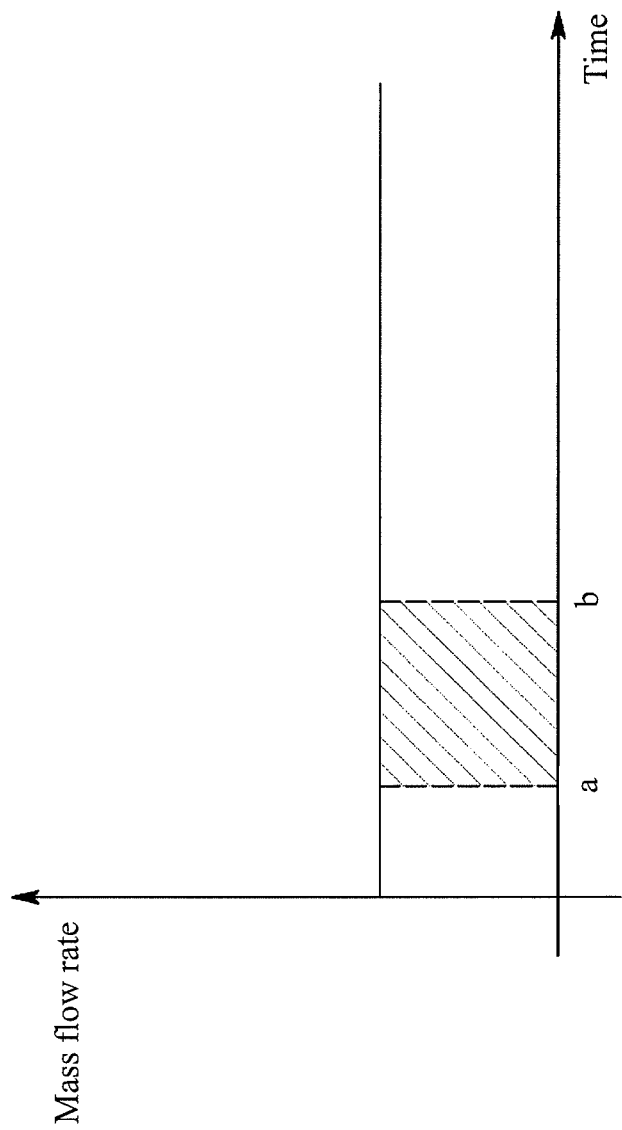
FIG. 9 is a diagram for explaining a mass flow rate integrated amount in this embodiment.

Then a predetermined program is stored in the internal memory of the control unit A2 and the CPU and its peripheral devices are operated based on the program so that the control unit A2 produces functions, as shown in FIG. 7, at least including a signal receiving section $2a$, a flow rate calculating section $2b$, a deviation calculating section $2c$, a control value calculating section 2D, a valve control signal output section 2E, a diagnostic parameter calculating section 2F, a specified value storage section $2g$, a comparing section $2h$ and a diagnostic result output section $2i$. The control value calculating section 2D, the valve control signal output section 2E and the diagnostic parameter calculating section 2F, will be described in detail.

The control value calculating section 2D calculates a feedback control value to the upstream side flow rate control valve 2Vb and/or the downstream side flow rate control valve 2Vc by providing at least a proportional calculation (preferably, a PID calculation) on the deviation obtained in the deviation calculating section 2c.

The valve control signal output section 2E produces an open degree control signal having a value based on the feedback control value obtained in the control value calculating section 2D, and outputs the open degree control signal to the upstream side flow rate control valve 2Vb and/or the downstream side flow rate control valve 2Vc. The valve control signal output section 2E makes use of the communication interface. In this embodiment, in order to conduct a diagnosis, a diagnostic close state signal to set the downstream side flow rate control valve 2Vc in a closed state can be output by appropriately operating, for example, an input interface.

The diagnostic parameter calculating section 2F receives the mass flow rate Q of the gas from the flow rate calculating section 2b and obtains a mass flow rate integrated value by conducting integration on the mass flow rate Q of the gas during an interval when the pressure at the downstream side of the resistive element 3 changes from a first pressure $P2_{START}$ to a second pressure $P2_{END}$ in a state that the downstream side flow rate control valve 2Vc is changed from the flow control state to the closed state. In addition, the diagnostic parameter calculating section 2F obtains a diagnostic volume value from gas laws based on a parameter such as the mass flow rate integrated value, a pressure value change (rise) between a pressure value of the inlet side sensor 4 at a start timing of the above-mentioned interval and a pressure value of the inlet side sensor 4 at an end timing thereof and a temperature value obtained from the temperature sensor 6.

More concretely, the diagnostic parameter calculating section 2F obtains a rise amount ΔP2 of the pressure value of the outlet side sensor 5 during an interval from a timing of the first pressure (a start point $P2_{START}$), for example, several msec after a time when the valve control signal output section 2E outputs the diagnostic close state signal as being a trigger to a timing of the second pressure (an end point $P2_{END}$) several sec~several min after the time. For example, in the case of FIG. 8, the pressure rise amount ΔP2 at the outlet side sensor 5 during the interval of a-b is obtained.

In addition, the diagnostic parameter calculating section 2F receives the mass flow rate Q during the interval of $P2_{START}$~$P2_{END}$ obtained from the following equation (6) by the flow rate calculating section 2b.

[Equation 6]

$$Q=(P1^2-P2^2)X \quad (6)$$

where P1 is a pressure value at the inlet side sensor 4 and P2 is a pressure value at the outlet side sensor 5. In addition, X is a coefficient that changes depending on the kind of gas.

Next, the diagnostic parameter calculating section 2F calculates the mass flow rate integrated value by conducting time-integration on the mass flow rate Q during the interval. For example, in the case of FIG. 9, a total sum of the mass flow rate Q in the interval of a-b shown by diagonal lines can be obtained as the mass flow rate integrated value n by means of the integrating calculation.

Furthermore, the diagnostic parameter calculating section 2F calculates a diagnostic volume value V by substituting the obtained mass flow rate integrated value n into the following equation (7) derived similar to the first embodiment.

[Equation 7]

$$V=nRT/\Delta P2 \quad (7)$$

where n is a number of moles (time-integrated value of a mass per time (a mass flow rate Q) obtained from the equation (6), namely a mass flow rate integrated value n), R is a gas constant (known from the gas to be controlled), T is a temperature (a value specified by an output from the temperature sensor 6) and ΔP2 is a pressure rise amount at the outlet side sensor 5.

A diagnostic method of the differential pressure type mass flow controller A having the above arrangement will be explained.

First, if the pressure detected by the outlet side sensor 5 is higher than the start pressure (at a time of $P2_{START}$), the pressure at the outlet side sensor 5 is lowered so as to be lower than the start pressure before making the downstream side flow rate control valve 2Vc in a closed state.

Figure 10:
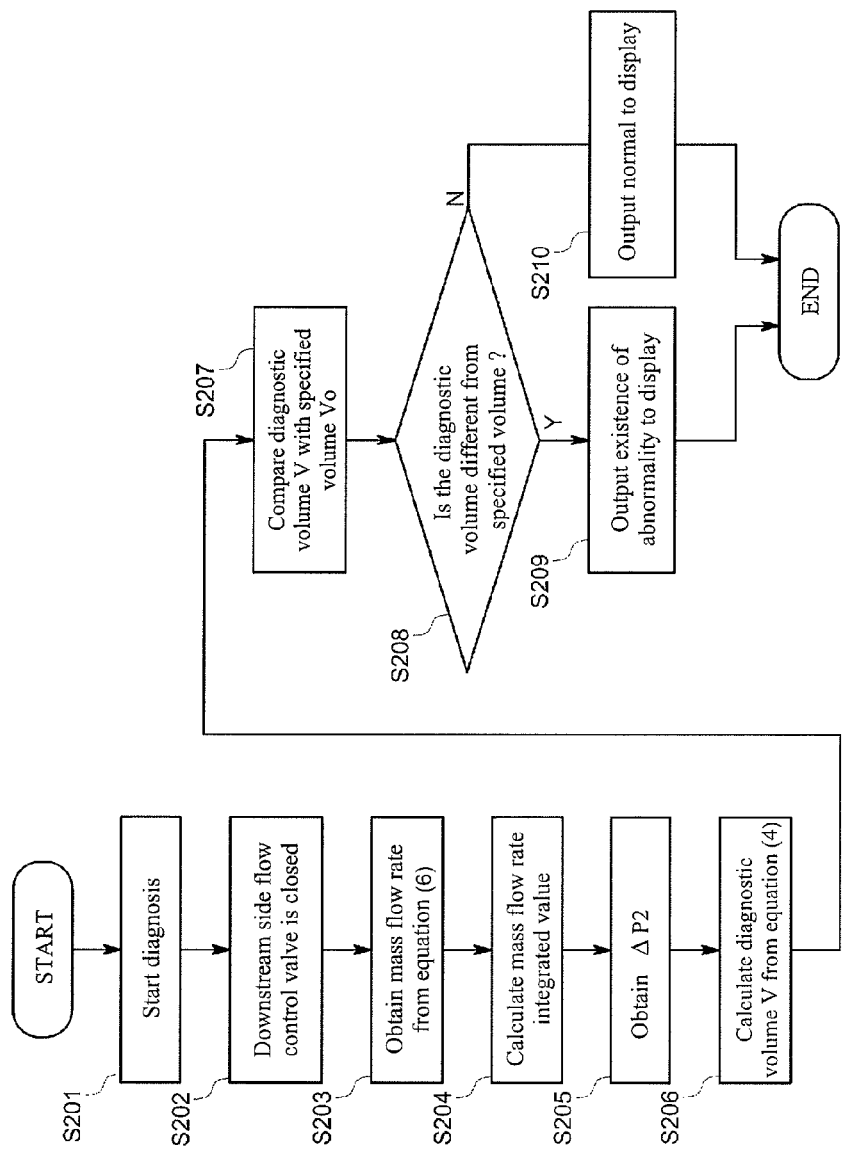
FIG. 10 is a flow chart showing an operation of the differential pressure type mass flow controller of this embodiment.

Then as shown in FIG. 10, the diagnostic close state signal is output from the valve control signal output section 2E of the control unit A2 to the downstream side flow rate control valve 2Vc that is in a flow control state (step S201).

When the downstream side flow rate control valve 2Vc receives the diagnostic close state signal, the downstream side flow rate control valve 2Vc becomes in a closed state (step S202). Then, a pressure in the dead volume Vy between the resistive element 3 and the downstream side flow rate control valve 2Vc begins to rise.

Then, the flow rate calculating section 2b calculates the mass flow rate Q from the above-mentioned equation (6) with the detected values detected in each pressure sensor 4, 5 as a parameter (step S203).

Next, the diagnostic parameter calculating section 2F receives the mass flow rate Q and calculates the mass flow rate integrated value n by conducting time-integration on the mass flow rate Q during the interval from $P2_{START}$ to $P2_{END}$ (step S204).

In addition, the diagnostic parameter calculating section 2F obtains the pressure rise amount ΔP2 at the outlet side sensor 5 during the interval from $P2_{START}$ to $P2_{END}$ (step S205).

Furthermore, the diagnostic parameter calculating section 2F calculates the diagnostic volume value V by substituting the obtained mass flow rate integrated value n and the temperature detected in the temperature sensor 6 into the above-mentioned equation (4) (step S206). The temperature T used for calculating the diagnostic volume value V may use the detected value by the temperature sensor 6 at the timing of $P2_{START}$ or may use the detected value at the timing of $P2_{END}$. This is because there is almost no temperature change between the timing of $P2_{START}$ and the timing of $P2_{END}$.

The comparing section 2h compares the diagnostic volume value V obtained in the diagnostic parameter calculating section 2F with the specified volume value $V_0$ (step S207). If the comparison result in the comparing section 2h shows that the diagnostic volume value V differs from the specified volume value $V_o$ (step S208), the diagnostic result output section 2i outputs an existence of the abnormality in the resistive element 3 to the display device (step S209). On the contrary, if the comparison result shows that the diagnostic volume value V is the same as the specified volume value $V_0$ (step S208), the diagnostic result output section 2i outputs no existence of abnormality in the resistive element 3 to the display device (step S210).

As a result, in accordance with the differential pressure type mass flow controller A of this embodiment, when the downstream side flow rate control valve 2Vc is changed from the flow control state to the closed state, the mass flow rate Q is calculated based on the detected values in each pressure sensor 4, 5, the mass flow rate integrated value is obtained by conducting time-integration on the mass flow rate Q during a certain interval based on the rising pressure value at the outlet side sensor 5, and the diagnostic volume value is obtained by substituting the mass flow rate integrated value and the above-mentioned pressure rise amount $\Delta P2$ into the gas laws. As a result, even though there is, for example, a local peak dip noise in the pressure value, almost no influence is received from the noise. Accordingly, it is possible to conduct a diagnosis of existence of abnormality with accuracy such that a clogging or residual gas generated due to deterioration with age of the laminar flow element as being the resistive element 3 can be found suitably. In addition, since a reference instrument for flow rate calibration becomes unnecessary and its calibration time also becomes unnecessary, a gas line can be simplified and a cost can be reduced as well. Furthermore, if the downstream side flow rate control valve 2Vc closes even for a moment, it becomes possible to conduct a diagnosis, thereby further simplifying the diagnosis. Especially, compared with a case of comparing a mass flow rate integrated value itself, $P1(P2)_{START}$, $P1(P2)_{END}$ can be freely set for either the G-LIFE diagnosis or the ROR diagnosis without being restricted by a condition for obtaining a specified value in the case of comparing a volume value. As a result, a highly accurate and easy diagnosis can be conducted, which makes it is further possible to conduct an inline diagnosis in a semi-conductor process more easily.

More specifically, it is possible to provide a differential pressure type mass flow controller A having a superior diagnostic mechanism such that a trouble such as clogging of the resistive element 3 can be found suitably and that the diagnosis of existence of abnormality can be conducted in a short period of time with accuracy.

In addition, since the laminar flow element having the nonlinear property is used as the resistive element 3, it is possible to make the pressure change relative to the flow rate change big in a low flow area and to make the pressure change relative to the flow rate change small in a high flow area, resulting in obtaining a flat flow rate accuracy collectively.

In addition, in the case that the comparison result in the comparing section 2h shows that the diagnostic volume value V differs from the specified volume value $V_0$, since the diagnostic result output section 2i that outputs the existence of abnormality of the resistive element 3 to the display device is arranged, it is possible to know the occurrence of abnormality in the resistive element 3 without fail. The present claimed invention is not limited to the above-mentioned embodiment.

For example, this invention can be applied to a diagnosis of a residual gas.

In this case, a basic configuration is the same as that of the first embodiment at least in a point that the diagnostic parameter, wherein the mass flow rate integrated value is set as the parameter, is compared with the specified value in a state of being free from a residual gas. If a residual gas exists, the diagnostic parameter does not coincide with the specified value. If purge is completely conducted and no different kind of gas in a previous process stays behind, the diagnostic parameter coincides with the specified value.

Then, for example, in the case that the volume in the first embodiment reads a different value (Yes in the step S108), the comparing section further obtains a data whether a kind of the gas is changed or not prior to (just before) diagnosis, if there is a change, the comparing section outputs that the abnormality is due to existence of the residual gas through a diagnosis result output section. The diagnosis result output section may further output a request for purge.

In accordance with this arrangement, it is possible to preferably apply a single mass flow controller to a case of controlling a flow rate of several different kinds of gas (multi gases).

More specifically, it is possible to judge and diagnose whether purge of the mass flow controller, conducted in the case of changing the kind of the gas controlled by the mass flow controller, is appropriate or not (whether a residual gas exists or not) easily and in a short period of time without other different arrangements. Eventually, for a differential pressure type mass flow controller for controlling a flow rate of the multi gases, it is possible to control the flow rate of the multi gases with high accuracy by removing an adverse influence from the residual gas.

In addition, for example, the diagnostic parameter may use a time-integrated value of the pressure during the interval while the pressure at the inlet side or the outlet side changes from a predetermined first pressure to a predetermined second pressure, a value other than the mass flow rate integrated value and the volume flow rate integrated value may be used as far as it can be calculated from the time-integrated value of the pressure. In this case, the specified value should be tailored to the kind of the diagnosis parameter. Furthermore, in the case of using the mass flow rate integrated value, the specified value is obtained by a previously conducted experiment or by simulation.

In this above-mentioned embodiment, the laminar flow element having a nonlinear property referred to as a nonlinear restrictor is used as the resistive element 3, however it may be appropriately varied to another resistive element 3 tailored to the embodiment.

In addition, the start timing or the end timing of the interval to be used for the integration calculation may be appropriately varied tailored to the embodiment. For example, in the case a starting point of a first pressure value and an ending point of a second pressure value that is different from the first pressure value are specified and the flow rate control valve is closed, the mass flow rate Q may be integrated during the interval from the first pressure value to the second pressure value and a value of a diagnostic parameter may be determined by making use of the integrated value as a parameter. In this case, $\Delta P1(\Delta P2)$ is not calculated on a case-by-case basis but may be previously stored in a memory.

In addition, the diagnosis result output section 2i is so arranged to output the existence of abnormality to the display device, however, a device to which the result is output is not limited to the display like this embodiment, and the result may be, for example, printed out.

Furthermore, the flow rate control valve may comprise a valve other than the flow rate control valve of the differential pressure type mass flow controller. For example, in the second embodiment, the differential pressure type mass flow controller A comprises the upstream side flow rate control valve 2Vb and the downstream side flow rate control valve 2Vc, however, the downstream side flow rate control valve 2Vc may be arranged outside.

Figure 11:
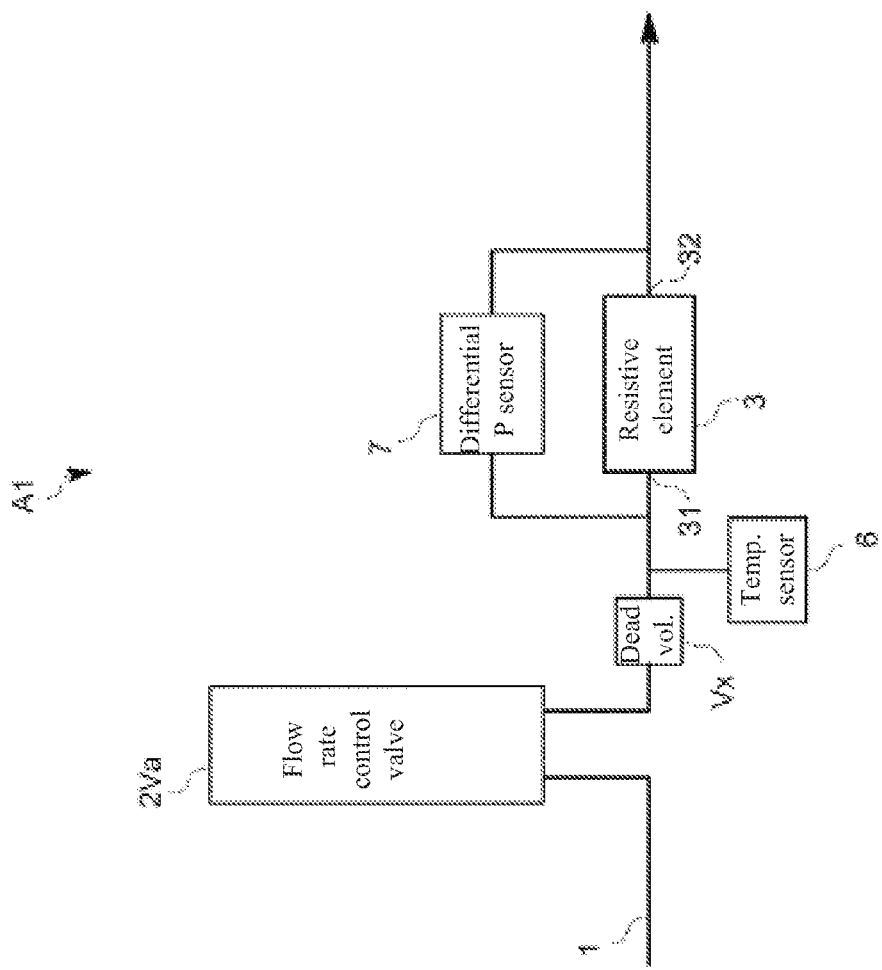
FIG. 11 is a pattern diagram showing a device configuration of a differential pressure type mass flow controller in accordance with another embodiment of this invention.

In addition, especially in the above-mentioned G-LIFE diagnostic type, a single differential pressure sensor 7 that measures a differential pressure between both ends of the resistive element may be used as shown in FIG. 11 instead of the inlet side sensor 4 and the outlet side sensor 5 as being the absolute pressure sensor. With this arrangement, since it is possible to reduce an influence from a noise of the pressure sensor and a cost as well, it can be further used more preferably for a fluid whose pressure changes.

Reasoning behind the above limitation of "especially in the above-mentioned G-LIFE diagnostic type" includes, since a chamber (vacuum) is connected in the secondary side for the G-LIFE diagnostic type, it is possible to obtain a flow rate in a primary side from a reading value of the differential pressure sensor 7 with the pressure in the secondary side set as a reference (zero).

Figure 12:
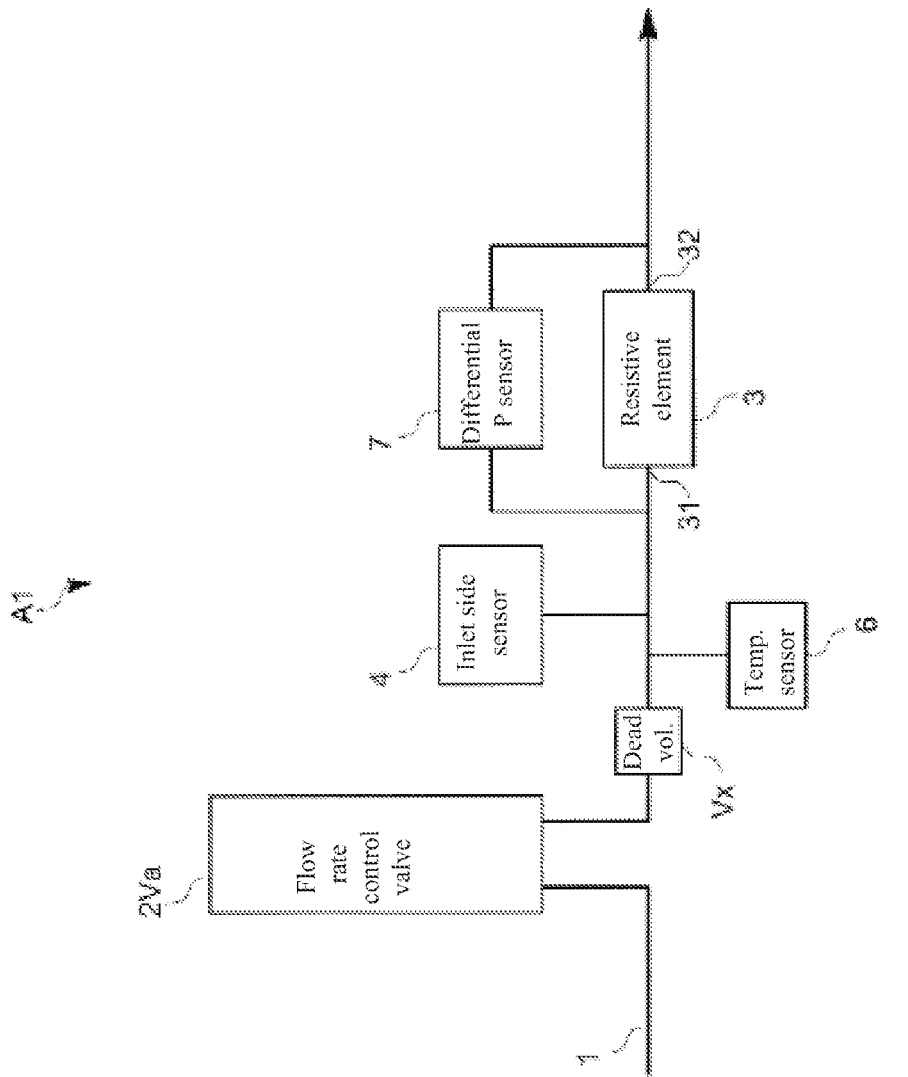
FIG. 12 is a pattern diagram showing a device configuration of a differential pressure type mass flow controller in accordance with further different embodiment of this invention.

In addition, either one of the inlet side sensor 4 and the outlet side sensor 5 as being the absolute pressure sensor (for example a sensor at the upstream side is the absolute pressure sensor as shown in FIG. 12) and the differential pressure sensor 7 may be combined.

Furthermore, the flow rate control valve may comprise a valve different from a control valve of the differential pressure type mass flow controller. In addition, the flow rate control valve may use a valve arranged on an upstream side or a downstream side of the differential pressure type mass flow controller in a flow channel to which the differential pressure type mass flow controller is connected.

In addition to the above-mentioned input of a signal to compulsorily make the valve in a closed state, a user may input a timing during a sequence to automatically control the differential pressure type mass flow controller A as a trigger to operate the diagnostic mechanism.

Figure 13:
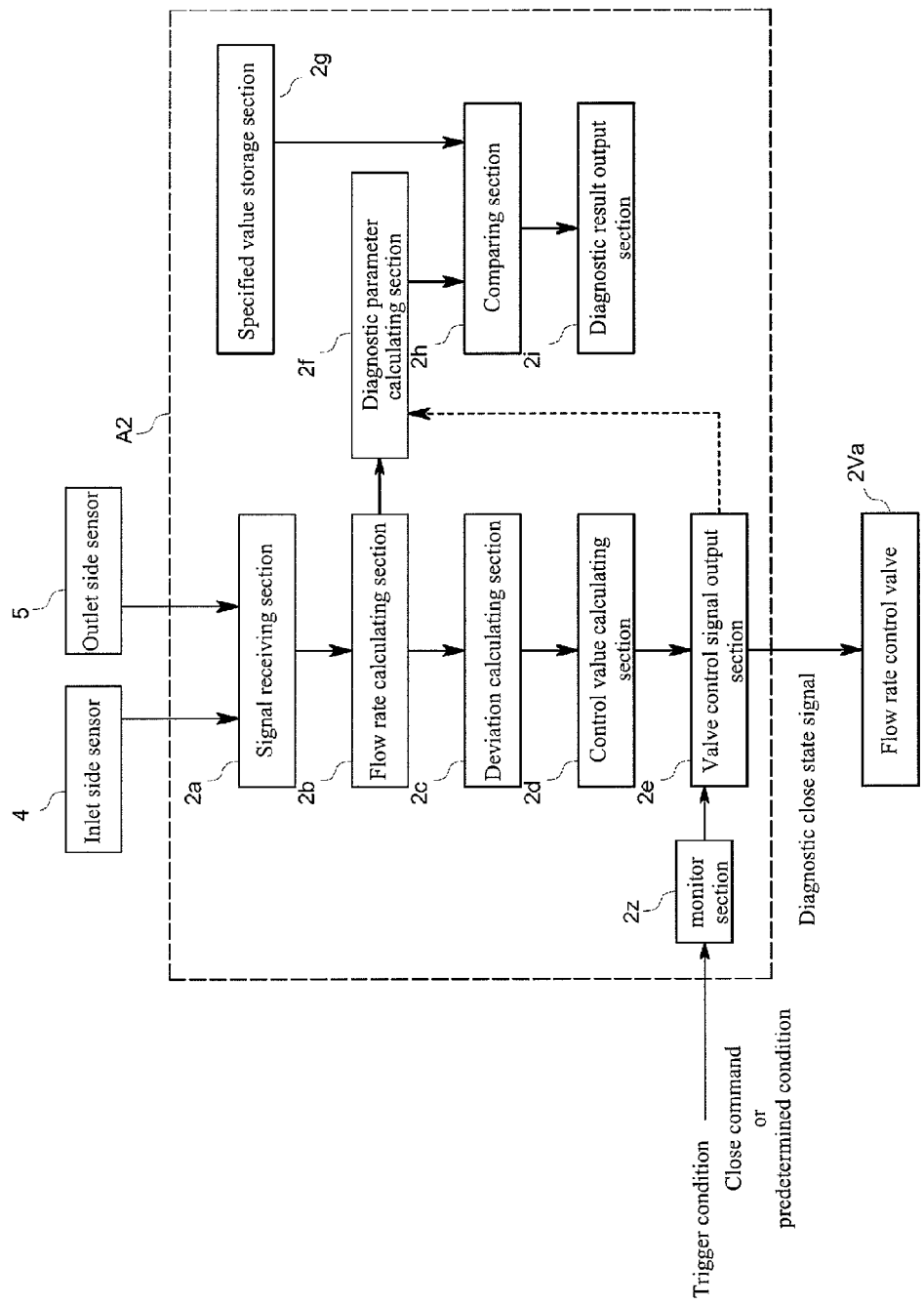
FIG. 13 is a functional configuration diagram of the differential pressure type mass flow controller of another embodiment of this invention.

Concretely, as shown in FIG. 13, a monitor section 2z is arranged to monitor a trigger condition to start a diagnosis during a sequence to automatically control the differential pressure type mass flow controller in a diagnostic mechanism. An object of a trigger condition to be monitored can be an object of "a predetermined condition", to be described later, to make the valve in a closed condition, in addition to a close command to make the valve in a closed state.

More concretely, similar to the first embodiment, for example, in the case that the flow rate control valve 2Va is arranged on the upstream side of the resistive element 3, a description of "the flow rate control valve 2Va is operated so that the pressure detected in the inlet side sensor 4 becomes higher than a value of the first pressure $P1_{START}$ as being the start pressure, and the signal to make the flow rate control valve 2Va in the closed state is output to the valve control signal output section 2e" can be made to be an object to be monitored as the above-mentioned condition. Then, during operation of the differential pressure type mass flow controller, in the case that the monitor section 2z finds this description, a self-diagnosis can be conducted at the timing described in the predetermined condition.

In addition, similar to the second embodiment, for example, in the case that the downstream side flow rate control valve 2Vc is arranged on the downstream side of the resistive element 3, a description of "the downstream side flow rate control valve 2Vc is operated so that the pressure detected in the outlet side sensor 5 becomes lower than a value of the first pressure $P2_{START}$ as being the start pressure, and the signal to make the downstream side flow rate control valve 2Vc in the closed state is output to the valve control signal output section 2E" can be made to be an object to be monitored as the above-mentioned condition. Then, during operation of the differential pressure type mass flow controller, in the case that the monitor section 2z finds this description, a self-diagnosis can be conducted at the timing described in the predetermined condition.

More concretely, similar to the first embodiment, for example, in the case that the flow control valve 2Va is arranged on the upstream side of the resistive element 3, a description of "the flow rate control valve 2Va is operated so that the pressure detected in the inlet side sensor 4 becomes higher than a value of the first pressure $P1_{START}$ as being the start pressure, and the signal to make the flow rate control valve 2Va in the closed state is output to the valve control signal output section 2e" can be made to be an object to be monitored as the above-mentioned condition. Then, during operation of the differential pressure type mass flow controller, in the case that the monitor section 2z finds this description, a self-diagnosis can be conducted at the timing described in the predetermined condition.

In addition, similar to the second embodiment, for example, in the case that the downstream side flow control valve 2Vc is arranged on the downstream side of the resistive element 3, a description of "the downstream side flow rate control valve 2Vc is operated so that the pressure detected in the outlet side sensor 5 becomes lower than a value of the first pressure $P2_{START}$ as being the start pressure, and the signal to make the downstream side flow rate control valve 2Vc in the closed state is output to the valve control signal output section 2E" can be made to be an object to be monitored as the above-mentioned condition. Then, during operation of the differential pressure type mass flow controller, in the case that the monitor section 2z finds this description, a self-diagnosis can be conducted at the timing described in the predetermined condition.

As a result, if the timing when a user wants to conduct the self-diagnosis is inputted as the predetermined condition as being the object to be monitored by the monitor section 2z, it is possible to conduct the self-diagnosis at the timing described in the predetermined condition.

As mentioned, it is possible to designate the timing when a user conducts the self-diagnosis freely with a simple operation to input the timing when the user wants to conduct the self-diagnosis into the sequence. In addition, there is no need of adding a special command and it is possible to easily incorporate this diagnostic mechanism into a conventional system.

In addition, since the valve is set to be in a completely uncontrolled state by compulsorily closing the valve, there will be no problem such that the valve opens abruptly due to an influence from a noise like a case that the flow rate is controlled so that the opening degree of the valve becomes zero. As a result, it becomes possible to conduct the self-diagnosis with high accuracy.

A concrete arrangement of each section is not limited to the above-mentioned embodiment, and may be variously modified without departing from a spirit of the invention.

The invention claimed is:

1. A diagnostic mechanism in a differential pressure type mass flow controller, the diagnostic mechanism comprising:
   a control unit configured with instructions executable by the control unit to:
   output from a valve control signal output section a signal for making a valve arranged in a flow channel wherein a fluid flows in a closed state;
   receive at a signal receiving section an inlet side detection signal and an outlet side detection signal from pressure sensors arranged at an inlet side and an outlet side of a differential pressure generating resistive element respectively, the differential pressure generating resistive element arranged in the flow channel;
   calculate at a diagnostic parameter calculating section a diagnostic parameter for diagnosing an abnormality in the differential pressure type mass flow controller, wherein the diagnostic parameter has a value based on a time-integrated value of a mass flow rate that is calculated based on a pressure at one of the inlet side or the outlet side obtained from one of the inlet side detection signal or the outlet side detection signal, respectively, during an interval while the pressure at one of the inlet side or the outlet side changes from a predetermined first pressure to a predetermined second pressure in a state where the valve is closed; and compare at a comparing section the value of the diagnostic parameter with a previously determined specified value.

2. The diagnostic mechanism in the mass flow controller described in claim 1, and further comprising:

a diagnostic result output section that outputs an existence of abnormality in a case that the value of the diagnostic parameter differs from the previously determined specified value.

3. The diagnostic mechanism in the mass flow controller described in claim 1, wherein the diagnostic parameter shows a volume value of the fluid calculated from a pressure difference between the predetermined first pressure and the predetermined second pressure and the mass flow rate integrated value, and the previously determined specified value is a volume value of the flow channel between the valve and the differential pressure generating resistive element.

4. The diagnostic mechanism in the mass flow controller described in claim 1, wherein the valve is arranged on a downstream side of the differential pressure generating resistive element, and the diagnostic parameter calculating section calculates the mass flow rate integrated value during the interval while the pressure at the inlet side drops from the predetermined first pressure to the predetermined second pressure.

5. The diagnostic mechanism in the mass flow controller described in claim 1, wherein the valve is arranged on a downstream side of the differential pressure generating resistive element, and the diagnostic parameter calculating section calculates the mass flow rate integrated value during the interval while the pressure at the inlet side rises from the predetermined first pressure to the predetermined second pressure.

6. The diagnostic mechanism in the mass flow controller described in claim 1, and characterized in that the differential pressure generating resistive element is a laminar flow element having a nonlinear property.

7. The diagnostic mechanism in the mass flow controller described in claim 1, wherein the pressure sensors comprise absolute pressure sensors each of which is arranged at the inlet side and the outlet side of the differential pressure generating resistive element respectively, or the pressure sensors comprise an absolute pressure sensor arranged at one of either the inlet side or the outlet side of the differential pressure generating resistive element, and a differential pressure type sensor arranged between the inlet side and the outlet side.

8. The diagnostic mechanism in the mass flow controller described in claim 1, wherein the valve control signal output section outputs the signal to make the flow rate control valve in the closed state on a condition that the pressure at the inlet side or the outlet side detected by the pressure sensors shows a predetermined value.

9. The diagnostic mechanism in the mass flow controller described in claim 8, in a case that the valve is a flow rate control valve and is arranged on the upstream side of the differential pressure generating resistive element, the condition is that the pressure detected by the pressure sensor at the inlet side shows a value higher than the predetermined first pressure as being a start pressure.

10. The diagnostic mechanism in the mass flow controller described in claim 8, in a case that the valve is a flow rate control valve and is arranged on the downstream side of the differential pressure generating resistive element, the condition is that the pressure detected by the pressure sensor at the outlet side shows a value lower than the predetermined first pressure as being a start pressure.

11. A diagnostic method in a differential pressure type mass flow controller, the method comprising:

changing a state of a valve arranged on a flow channel where a fluid flow is changed from an open state to a closed state;

obtaining a mass flow rate value of the fluid based on detected values in one of an inlet side sensor and an outlet side sensor that detect one of a pressure at an inlet side and a pressure at an outlet side of a differential pressure generating resistive element arranged in the flow channel, wherein the mass flow rate value is obtained at a time when the flow rate control valve is set in the closed state;

calculating a diagnostic parameter for diagnosing an abnormality in the differential pressure type mass flow controller, wherein the diagnostic parameter calculated from a mass flow rate integrated value during an interval while the pressure at one of the inlet side or the outlet side changes from a first pressure to a second pressure; and comparing a value of the diagnostic parameter and a previously determined specified value.

12. A differential pressure type mass flow controller comprising:

a flow rate control valve arranged on a flow channel where a fluid flows;

a differential pressure generating resistive element that comprises an inlet into which the fluid flowing from the flow rate control valve is introduced and an outlet from which the fluid is discharged and that generates a differential pressure between the inlet and the outlet;

an inlet side sensor that is arranged continuous to the flow channel at the inlet side and that detects a pressure of the fluid flowing in the flow channel;

an outlet side sensor that is arranged continuous to the flow channel at the outlet side and that detects a pressure of the fluid flowing in the flow channel;

a diagnostic parameter calculating section that obtains a mass flow rate integrated value from a pressure value at the inlet side sensor that drops in a case that the flow rate control valve is changed from a flow rate control state to a closed state by integrating calculation and that further obtains a diagnostic volume value for diagnosing an abnormality in the differential pressure type mass flow controller by substituting the obtained mass flow rate integrated value into the ideal gas law; and a comparing section that compares the diagnostic volume value obtained in the diagnostic parameter calculating section with a previously determined specified volume value.

13. A differential pressure type mass flow controller comprising:
- an upstream side flow rate control valve and a downstream side flow rate control valve arranged on a flow channel where a fluid flows;
- a differential pressure generating resistive element that comprises an inlet into which the fluid flowing from the upstream side flow rate control valve is introduced and an outlet from which the fluid is discharged and that generates a differential pressure between the inlet and the outlet;
- an inlet side sensor that is arranged continuous to the flow channel at the inlet side and that detects a pressure of the fluid flowing in the flow channel;
- an outlet side sensor that is arranged continuous to the flow channel at the outlet side and that detects a pressure of the fluid flowing in the flow channel;
- a diagnostic parameter calculating section that obtains a mass flow rate integrated value from a pressure value at the outlet side sensor that rises in a case that the downstream side flow rate control valve is changed from a flow rate control state to a closed state by integrating calculation and that further obtains a diagnostic volume value for diagnosing an abnormality in the differential pressure type mass flow controller by substituting the obtained mass flow rate integrated value into the ideal gas law; and
- a comparing section that compares the diagnostic volume value obtained in the diagnostic parameter calculating section with a previously determined specified volume value.

* * * * *